3,609,906
SOLID FERRULE CONSTRUCTION
Paul C. Johnson and Thomas E. Grein, Spirit Lake, Iowa, assignors to Berkley & Company, Inc., Spirit Lake, Iowa
Filed Feb. 7, 1969, Ser. No. 797,527
Int. Cl. A01k 87/02
U.S. Cl. 43—18 GF                          4 Claims

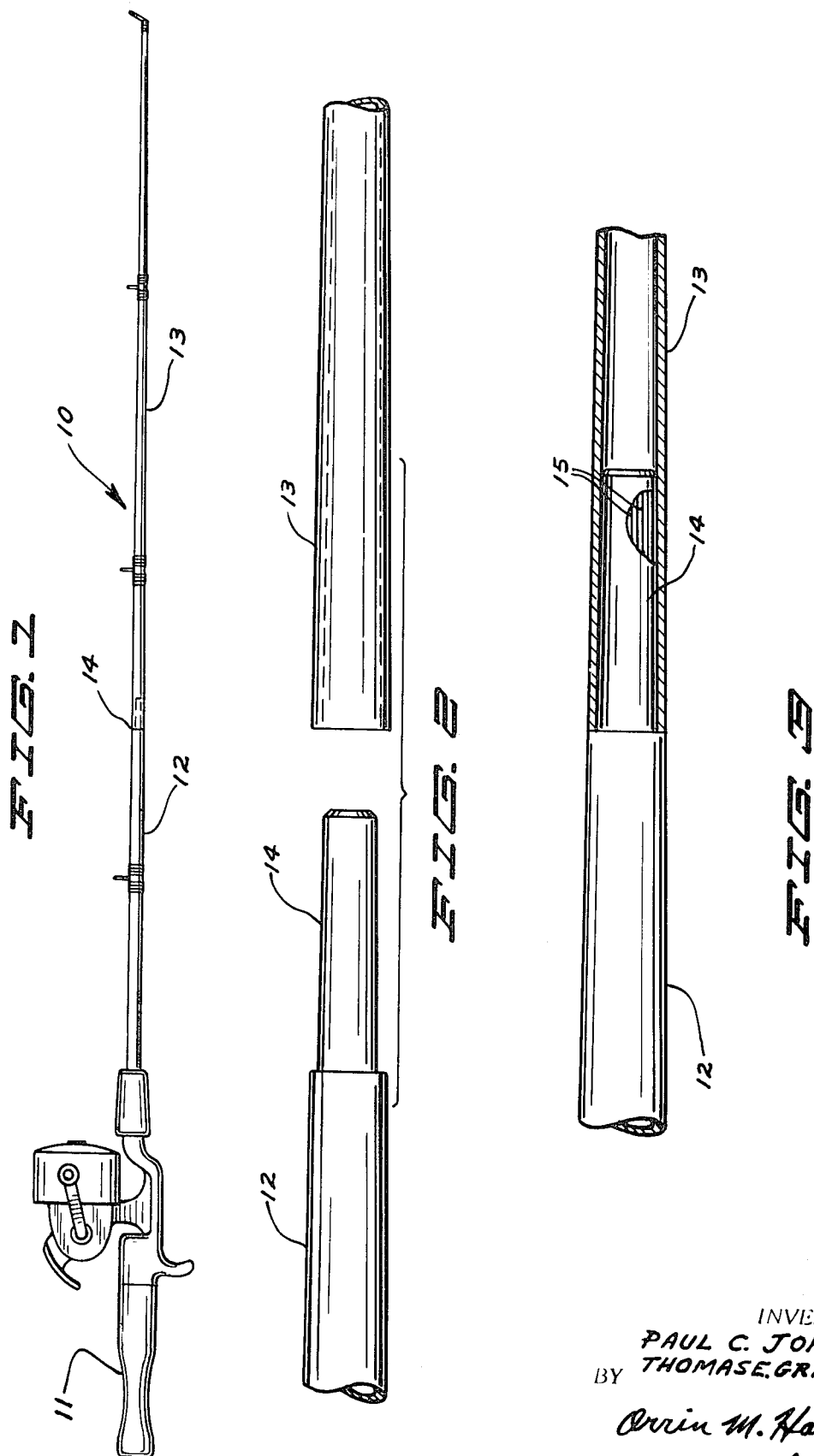

ABSTRACT OF THE DISCLOSURE

A fishing rod having a flexible shaft tapering continuously from the butt end to the tip end and comprising a plurality of individual segments coupled together by means of coupling ferrules. The individual ferrules are formed to have a prong portion extending from the forward end of the rod segment, the exterior contour and dimensions of the prong portion substantially matching the contour and dimensions of the inner wall of the segment to receive the prong portion, the flexural characteristics of the ferrule being substantially the same as those of the individual shaft segments. The prong portion is solid, resilient, and compressible, and is in the form of a tapered plug of generally frusto-conical form, with an outer diameter providing an interference fit with the inner diameter of the shaft segments, when the prong is inserted at its final insertion depth.

---

The present invention relates generally to an improved flexible shaft device, and more particularly to an improved flexible shaft which is adapted for use as a segmented fishing rod, the shaft being formed by coupling together a plurality of segments by means of ferrules which have flexural characteristics substantially matching those flexural characteristics of the individual shaft segments. Segmented fishing rods made in accordance with the present invention have the characteristics of a uniformly bending shaft element which, when assembled, acts as a unitary continuous structure with a minimum of nodal points disposed along the length of the shaft.

In the design of flexible shafts which are destined for use for various applications, and particularly when destined for use as fishing rod shafts, it is desirable to provide a shaft which is capable of functioning as a "unit" free of any nodal points along the shaft during the normal vibration thereof. At the same time, it is frequently desirable to provide a fishing rod shaft which is capable of being broken-down into individual segments which can be assembled together by ferrule couplings or the like. When a rod or shaft is capable of functioning as a "unit" free of nodal points, the action and reaction of the shaft is more predictable, and this is manifested in the accuracy of a user in casting a bait, for example. This "casting" of a bait is therefore accomplished with less effort and the result is generally far more accurate. Thus, the fisherman may find his casting technique far more predictable than he would when using rods which are fragmented or discontinuous with a variety of nodal points being introduced along the axial length of the shaft. Thus, spurious modes of vibration may be established when these various nodal points are disposed along the length of the shaft and these spurious modes of vibration are responsible for lack of uniformity, consistency, and predictability in the effort of the user. In other words, it is generally desirable to utilize a rod shaft structure which will experience a minimum of localized structural abnormalities, and which will also respond in a predictable and desirable manner for the user. Uniformity in rod structure has been found to increase the output response which the rod provides to a given input of energy. Also, it has been learned that when a given rod is subjected to the playing action of a fish, the rod which functions in a predictable and uniform manner will enable the user to more easily and readily maintain a constant tension on the line without permitting slack to develop which will in turn permit the fish to disengage.

The provision of a rod having uniform or predetermined tapering characteristics, both dimensionally and mechanically, can be readily achieved by utilizing a single shaft, preferably a hollow core shaft. Fishermen normally prefer to have a rod which can be disassembled when not in use, so as to facilitate more convenient handling and storage. Whenever a rod shaft is broken in this fashion, various anomalous characteristics develop which are in turn reflected by a rod action which is discontinuous, non-uniform, or capable of generating spurious modes of vibration. In addition, it is possible that localized fatigue will result from such discontinuities due to the presence of local areas of stress concentration in the shaft, particularly during use.

In accordance with the present invention, a flexible shaft which is particularly adapted for use as a fishing rod is provided, this shaft being formed by coupling together a plurality of individual segments of a hollow core shaft by the use of ferrules having flexural characteristics substantially matching the flexural characteristics of the shaft segments. These ferrule elements are secured to the inner peripheral wall of the hollow core shaft at the narrow tip end of each of the segments, the ferrule extending as a male prong member beyond the tip end of the rod segment. This ferrule is arranged to releasably retain the mating or adjoining segments together, and thus the outer periphery of the male prong member is adapted to be releasably received along and adjacent the inner periphery of the trailing end of the next succeeding segment being joined. Care is taken so that the outer periphery of the male prong member substantially matches the inner periphery of the trailing end portion of the next adjacent segment and provides an interference fit therewith at final insertion depth, this generally requiring that the prong member be frusto-conical in configuration. The prong comprises a solid resilient and compressible body which is preferably provided with elongated reinforcing members arranged generally parallel to the axis of the prong. This resilient, compressible prong provides a retaining means to be received along the inner diameter of the trailing end of the next succeeding mating segment. It has been found that this arrangement provides a finished rod shaft of substantially uniform flexural characteristics from the butt end to the tip end thereof, and the ferrule means as herein described, provide a substantial locking action on the rod segments being joined.

In order to ascertain the proper match of the prong portion of the ferrule to the fishing rod segments, it is necessary to provide a pair of supporting fulcrums in spaced apart relationship to receive a span of the fishing rod blank, the fulcrums being spaced apart a distance which comprises at least about 20 percent or more of the length of the shaft. Thereafter, a static load is applied to the mid-point of the span in order to obtain a substantial lateral deflection of the span. The rod shaft is then severed transversely of the axis of the shaft at the mid-point or load-applying point to form a pair of mating segments, and thereafter a ferrule consisting of the male prong is inserted into the narrow end of the larger segment, the free end of the prong extending outwardly to provide an interference fit with the open end of the smaller diameter segment. With the re-assembled device repositioned and supported in the same manner, the same load is applied to the segmented shaft at the zone of the cut, and the lateral deflection is again observed. The device will perform properly when the lateral deflection of the severed unit substantially matches the lateral deflection of the integral unit shaft.

For best results, it has been found desirable to provide a prong member which, for most fishing rod shafts in the 4 foot to 7 foot length, is about 4 inches in length, the prong being received in the two segments being joined. In a typical installation, the span length is 12 inches, with the male prong member being, as indicated, about 4 inches in length.

Materials capable of providing resilient compressible physical characteristics include certain polyester resins, certain epoxy resins, and certain styrene polymers and copolymers. Reinforcing material may be either stranded glass roving, or stainless steel or other metallic filaments. The present application provides a variety of combinations for use in the concept.

Therefore, it is an object of the present invention to provide an improved technique to provide, and apparatus for providing an internally-disposed ferrule means for coupling two segments of a hollow core rod together, the ferrule providing a substantial match of the flexural characteristics of the rod shaft so as to provide a complete unit capable of acting as a single unitary structure.

It is yet a further object of the present invention to provide an improved means for coupling two segments of a hollow tapered flexible shaft together, the coupling means including a ferrule arranged to be secured to the inner periphery of one rod segment, and adapted to be received along the interior surface of the next succeeding rod segment of generally smaller diameter, the arrangement being such as to permit and promote the formation of a rod capable of being readily disassembled, but yet which, when assembled, provides a rod of substantially uniform flexural characteristics from the butt end to the tip end thereof.

It is yet a further object of the present invention to provide an improved ferrule means for coupling together two segments of a tapered hollow core shaft, the ferrule including a solid compressible, resilient retaining means secured to the free end of one segment and having an outer dimension which provides a substantial interference fit with the inner periphery of the wall of the adjacent mating segment when at the final insertion depth.

Other and further objects of the present invention will become apparent to those skilled in the art upon a study of the following specification, appended claims, and accompanying drawing, wherein:

FIG. 1 is a plan view of the fishing rod employing the coupling ferrule of the present invention;

FIG. 2 is a detail view, on a slightly enlarged scale, showing the structure of the coupling ferrule as used in the shaft of the fishing rod of FIG. 1; and FIG. 3 is a detail view, also on a slightly enlarged scale, showing the segments of the rod in joined-together relationship, with one of the segments being shown in a section taken through the diameter of the shaft.

In accordance with the preferred modification of the present invention, and with particular reference to FIGS. 1–3 of the drawing, the rod assembly generally designated 10 includes a handle portion 11, the handle 11 being secured to the butt end of the rod shaft, the shaft being formed by a pair of segments including the segment 12 and the segment 13. These segments are joined together by the ferrule member 14, the ferrule being secured to the inner periphery of the segment 12, and extending outwardly from the free end of the segment 12 as shown in detail in FIG. 2.

The prong member 14 which, per se, substantially comprises the ferrule, is fabricated from a resilient compressible, solid material, preferably reinforced with elongated fibers extending substantially parallel to the axis of the member 14. The outer diameter of the prong 14 has a contour which substantially matches the inner contour of the segment 13 at the butt end thereof, the outer diameter of the prong 14 being adequate to provide an interference fit with the segment 13 when at its final insertion depth.

In FIG. 3 of the drawing, particular attention is directed to the broken away portion which illustrates a plurality of reinforcing elements 15—15 which are formed in the structure, as previously indicated.

In order to achieve the degree of interference fit desired, it is generally necessary to have the prong member 14 provided with an outer diameter which exceeds the inner diameter of the segment 13 by an amount equal to between about 1 mil and 3 mils; however, in some situations, a suitable retention can be achieved with some dimensions outside of this range.

In the structure, as illustrated in the drawing, no attempt has been made to set forth the details of the mounting or receiving means for the shaft in the handle portion, nor has any detail been given for the means of mounting the reel upon the handle. These arrangements are conventional, and accordingly form no part of the present invention. Thus, conventional means well known in the art may be employed.

The materials of construction for the shaft are preferably a plastic-impregnated glass cloth. As is conventional in this art, the cloth is rolled upon a mandrel to the desired configuration, and thereafter cured in the conventional way. The glass cloth preferably has the majority of the filaments running in the axial direction of the shaft in order to provide for superior rod action. Glass cloth impregnated with various resins, such as phenolics or epoxies, with particular application to fishing rod structures are available commercially. The materials of the prong member 14 are set forth hereinbelow, it being important to match the flexural characteristics of the prong member 14 with the flexural characteristics of the shaft segments 12 and 13.

In order to enable those skilled in the art to practice the concept, the following examples are given as typical preparation techniques for male prong members to be utilized in ferrules for thin-walled hollow core shafts.

EXAMPLE 1

Composition:
  Stypol #40–2422 (rigid polyester resin manufactured by Freeman Chemical Co. of Port Washington, Wis.): 100 parts by wt.
  Styrene monomer: 10 parts by wt.
  Catalytic USP–245 peroxide curing agent manufactured by Argus Chemical Corp.: 0.5 parts by wt. of resin The above resin-monomer mixture was thoroughly stirred to insure homogeneity. Fiberglass roving (60-end volan or silane finish) was wet out with the above resin blend. The wetted out roving (22–60 end strands) was then pulled into a .375 inch internal diameter metal tube to yield a glass content of 56.4 percent based on the total weight of the glass/resin cured rod. Curing of the composite was achieved by heating at 150° C. for 30 minutes to insure total polymerization.

EXAMPLE 2

Composition:
  Epon # 815 (rigid epoxy resin manufactured by Shell Chemical Company): 66 parts by wt.
  Versamid 125 (low mol. wt. polyamide resin manufactured by General Mills): 34 parts by wt.

The foregoing mixture was thoroughly stirred. Fiberglass (60-end volan or silane finish) was wet out with the above resin blend. Using 22 strands of roving pulled into a .375 inch internal diameter metal tube to yield a glass content of 58.2 percent by weight. Curing achieved was the same as in Example 1.

EXAMPLE 3

Stypol #40–2422: 70 parts by wt.
Stypol #40–2092 (rigid and flexible polyester resins manufactured by Freeman Chemical Co.): 30 parts by wt.
Styrene monomer: 10 parts by wt.
USP–245 catalytic peroxide curing agent manufactured by Argus Chemical Co.: 0.5 parts by wt. of resin mixture The above mixture was thoroughly blended, combined, and cured as in Example 1 to yield a glass content of 53.9 percent by weight glass of the total cured rod weight.

EXAMPLE 4

Genepoxy #190 (rigid epoxy resin manufactured by General Mills): 70 parts by wt.
Curing Agent U (diamine catalyst manufactured by Shell Chemical Co.): 30 parts by wt.

The above mixture was thoroughly blended. The resin mixture was combined with continuous length stainless steel multi-filament manufactured by Brunswick Corp. to attain stainless steel fiber content of 51.6 percent by weight of the total cured rod weight. Processing and curing were achieved by the same procedure as in Example 1.

In order to determine the deflection characteristics of the composite structure with that of the unitary structure, a span width of 12 inches was selected for a typical rod structure, with a load being applied to the mid-point of the 12-inch span. The total length of the rod shaft in each case was 60 inches. The following table illustrates the deflection-bend characteristics of the structure:

TABLE I.—DEFLECTION-BEND DETERMINATIONS

|  | Load | | |
| --- | --- | --- | --- |
|  | 2.5 lb. | 5.0 lb. | 7.5 lb. |
| Control (tubular woven glass cloth rod blank made from phenolic resin 28% by wt. and woven glass cloth 72% by wt., .355″ O.D. x .311″ I.D.), inch | .062 | .120 | .175 |
| Example 1—Rigid polyester resin plus glass, inch | .058 | .110 | .177 |
| Example 2—Rigid epoxy resin plus nylon resin plus glass, inch | .066 | .127 | .186 |
| Example 3—Rigid and flexible polyester resin plus glass, inch | .065 | .118 | .169 |
| Example 4—Rigid epoxy resin plus stainless steel fiber, inch | .060 | .120 | .181 |

In the event some additional reinforcing is felt desirable in the area of the ferrule, the winding of a line guide may be disposed along and adjacent the area of the segment 13 at its butt end. In addition to the aesthetic considerations, it has been found that there is less contribution of instability to the entire system whenever a ferrule is disposed in the area of a line-guide winding. The over-all disruption of rod unity is therefore substantially nil as compared with a rod having a solid tube configuration with knockdown ferrule features included.

In certain instances it has been found preferable to contour the walls of the rod adjacent the ferrule area in order to provide a greater degree of stability and uniformity of interference fit, and uniformity of flexural characteristics to the complete rod. In this connection, the rod is generally milled in the area of the ferrule so as to provide a slightly reduced wall thickness for the rod in the immediate area of the ferrule. Continuity in mechanical and flexural qualities from one end of the rod to the other are thereby preserved. In this connection, however, for rods of modest cross-sectional size, and modest wall thicknesses, it has not been found necessary to modify the rod structure in the area of the coupling ferrules.

A particularly valuable feature of this invention lies in the production of the rods, and the minimum number of operations added by virtue of inclusion of the features of the present invention. In this connection, a single rod shaft or blank is formed having the length desired for the finished product, and this rod shaft is then cut transversely to the axis thereof to form the mating segments. These segments are then fitted with the ferrule member in order to permit the rod to be assembled as a single unitary member with substantially uniform mechanical and flexural characteristics.

It will be appreciated that the examples provided herein are for purposes of illustration only, and are not to be otherwise construed as a limitation upon the scope to which this invention is otherwise entitled. Those skilled in the art may depart from these various specific embodiments without necessarily departing from the spirit and scope of the invention.

What is claimed is:

1. A fishing rod comprising a thin-walled shaft being formed of a plurality of individual flexible segments of cured synthetic resin reinforced with glass cloth, the forward end of certain segments being adapted to be mated to the trailing end of the next adjacent forward segment, the segments being adapted to be retained together to form a single unitary structure of generally hollow core construction and having a gripping handle at the butt end thereof, the unitary structure tapering continuously from the butt end to the tip end of the composite structure with the forward and trailing ends of each pair of mating segments being joined together with the inner diameter, outer diameter, and wall thickness of the mated segments being arranged in substantial continuation along the shaft and adjacent the juncture points of the mating segments, said rod further comprising;

(a) ferrule means arranged to releasably retain said mating segments together with the cross sectional surfaces of the walls of adjacent sections being in abutting relationship, one to another, said ferrule means comprising a resilient, compressible, solid male coupling prong secured to the inner periphery of the forward end of one of said mating segments and adapted to be received within the hollow inner core of the trailing end of the next forwardly adjacent segment, said prong extending outwardly from said forward end and being generally tapered from said forward end along the axial extent thereof to a contour substantially matching the inner contour of the hollow inner core of the next forwardly adjacent segment along the juncture region, said male coupling prong being provided with reinforcing fibers extending essentially only generally axially and longitudinally thereof and having an external diameter with a dimension providing a substantial interference fit with the hollow inner core of the next forwardly adjacent mating segment when at the final insertion depth, the lateral flexural properties of said male coupling prong substantially matching those of said rod segments.

2. The fishing rod as defined in claim 1 being particularly characterized in that said reinforcing fibers for said male coupling prong are selected from the group consisting of glass fibers and metallic filaments.

3. The fishing rod as defined in claim 1 being particularly characterized in that said male coupling prong consists essentially of a resin selected from the group consisting of polyester resin and epoxy resin, with the reinforcing fibers consisting of glass filaments.

4. The fishing rod as defined in claim 3 being particularly characterized in that said coupling prong comprises substantially between about 40 percent and 50 percent of a resin selected from the group consisting of polyester resins and epoxy resins, balance reinforcing fibers.

References Cited

UNITED STATES PATENTS

| | | | |
|---|---|---|---|
| 467,979 | 2/1892 | Latulip | 43—18 X |
| 553,005 | 1/1896 | Leeper | 43—18 |
| 2,536,388 | 1/1951 | Murray | 43—18 |
| 2,602,766 | 7/1952 | Francis | 43—18 (GF) X |
| 3,310,903 | 3/1967 | Binvignat | 43—18 |
| 2,484,003 | 10/1949 | Simison | 43—18 (G.F.) UX |
| 3,260,010 | 7/1966 | Dubois | 43—18 (G.F.) |
| 3,519,294 | 7/1970 | Barnes | 43—18 X |

FOREIGN PATENTS

| | | | |
|---|---|---|---|
| 1,148,860 | 7/1957 | France | 43—18 (G.F.) |

SAMUEL KOREN, Primary Examiner

D. J. LEACH, Assistant Examiner

U.S. Cl. X.R.

287—126